United States Patent [19]
Willner

[11] Patent Number: 6,150,654
[45] Date of Patent: Nov. 21, 2000

[54] FIBER OPTIC COMPUTER APPARATUS

[76] Inventor: Byron J. Willner, 1020 Hillcrest Dr., Vienna, Va. 22180

[21] Appl. No.: 09/168,609

[22] Filed: Oct. 9, 1998

[51] Int. Cl.[7] .................................................... G11C 13/04
[52] U.S. Cl. ..................................... 250/227.11; 365/106
[58] Field of Search .......................... 250/227.11–227.18; 365/106, 110, 118–121

[56] References Cited

U.S. PATENT DOCUMENTS 4,867,515  9/1989  Namandin ..................................... 385/1

*Primary Examiner*—Stephone B. Allen
*Attorney, Agent, or Firm*—Alfred F. Hoyte, Jr.

[57] ABSTRACT

A fiber optic computing transistor apparatus is provided. In it most basic form, the invention contemplates a stack of vertically aligned optical transistors. The transistor are optically isolated from each other by an opaque material, and are selectively read by pulsing control lines which are operably connected to light responsive areas of the transistor. The system of the invention would have particular application in environments where stray electromagnetic radiation is to be minimized.

3 Claims, 6 Drawing Sheets

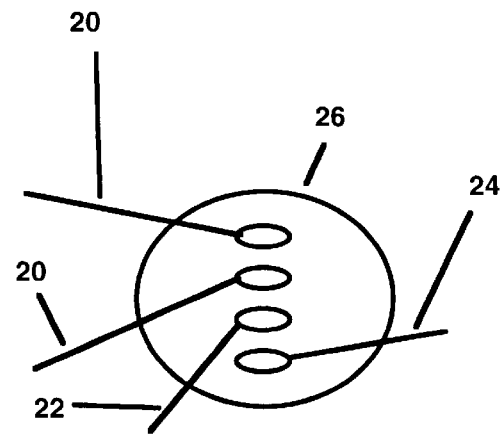
FIGURE 3
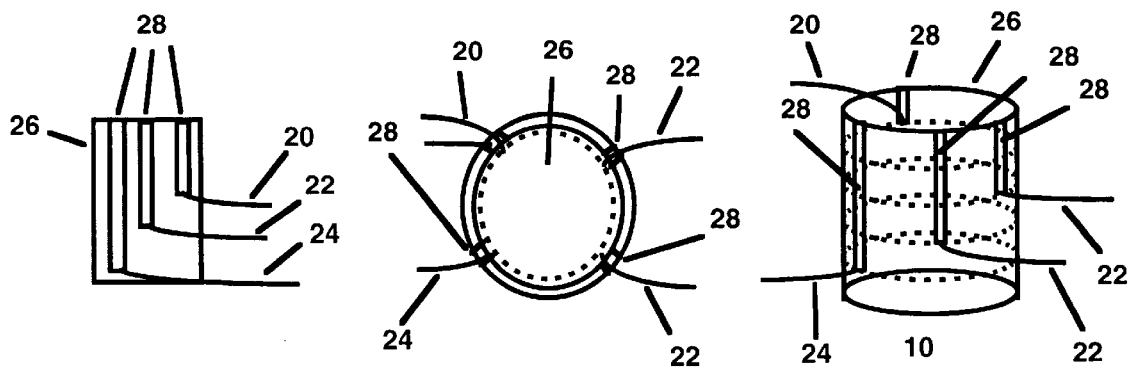
FIGURE 4A  FIGURE 4B  FIGURE 4C

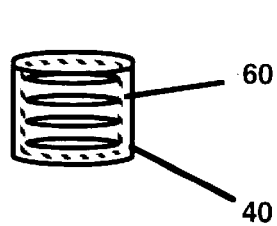
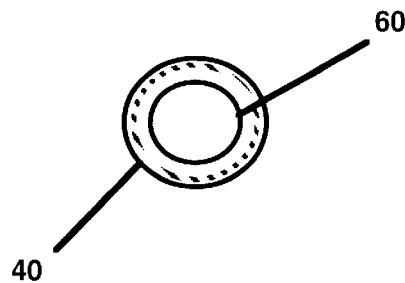
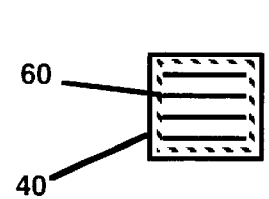
FIGURE 7A      FIGURE 7B      FIGURE 7C
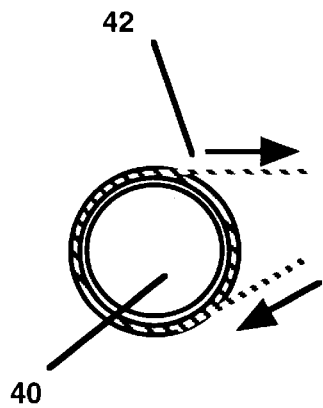
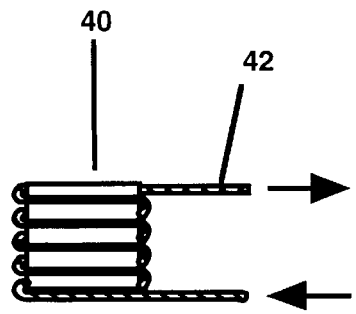
FIGURE 8A      FIGURE 8B

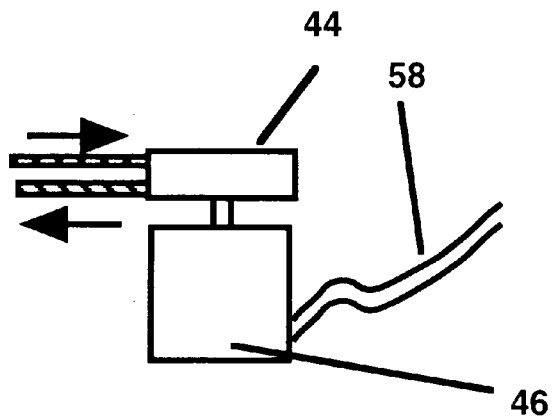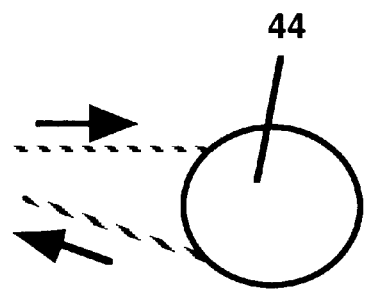
FIGURE 9B  FIGURE 9A
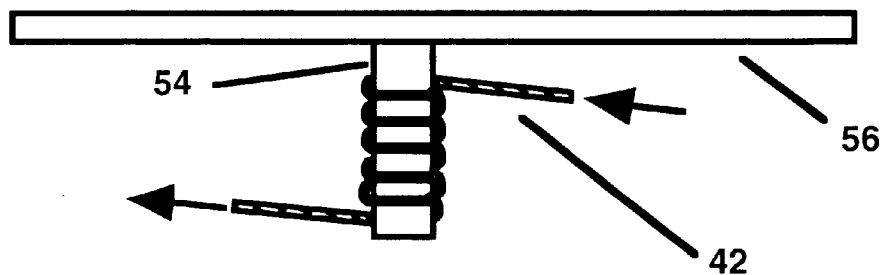
FIGURE 10A
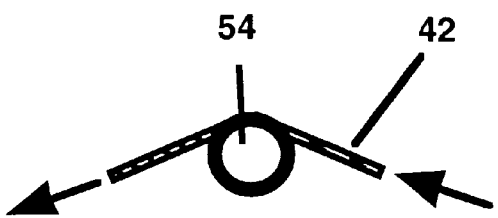
FIGURE 10B

FIBER OPTIC COMPUTER APPARATUS

BACKGROUND OF THE INVENTION

Field of the Invention

The present invention relates to computers. More specifically, it relates to an improved computer apparatus designed for the development of computational activity using light, light sensitive devices, and fiber optic components.

SUMMARY OF THE INVENTION

Briefly, the invention contemplates the use of fiber optic strands, fiberglass, resin, and/or plastic as a bases for computer processing hardware, eliminating the need for optoelectronic interfaces within the computer housing. This includes, but is not limited to, the motherboard, daughterboard, processors, interconnection of components, display, and power source. The computer will operate in the visible light spectrum, with light pulses used to establish clock speed, pulse rate, data transfer, etc. The computer material will be such that it will be unaffected by radiation or processing speed. The computer will operate at very high clock speeds, and minimal heat would be generated from the use of fiber optics in computer processing.

In accordance with the invention, Peripheral Digital Interface equipment may be physically linked to the system using such equivalent standards as IEEE 1394 (which is for electrical/electronic resources) for fiber optics and fiber optic equipment interfacing, time-critical data for just-in-time delivery (isochronous) eliminates costly buffering. The IEEE 1394 power lines would allow transmission of light energy from the light sources and regular fiber optic signal lines would be used as signal carriers. Parallel processing would be possible with the addition of multiple signal lines within a single cable.

In one aspect of the invention, digitally coded white or monochromatic light is transmitted along a single fiber optic line to a junction containing a light responsive material connected to two, three, or more fiber optic lines which would form a junction which allows information to be selectively gated to a designated path. The use of different frequencies of monochromatic light in the system allows several methods of controlling data flow.

The processors are to be constructed from layers of thin nonferrous, nonmetallic, or noninductive laminated material. The material is made sufficiently thin to allow for a large number of layers, with each layer having at least one junction to be stacked, each stack having a high number junctions connected to fiber optic lines.

In its most basic form, the invention contemplates a stack of optical transistors, each being controllably switched from a logic one to a logic zero, which stack can be used as part of an information processing system.

Data flow and storage is controlled by chemical reactions which provide color variations within the fiber optic transistors. The color changes correspond to predetermined logic states or conditions. An alternative power source is an atomic turbine/generator to provide a light source.

A simple fiber optic transistor used as a gate would contain three fibers. One fiber would be an input line, another would be an output line and the third would be a control line. U.S. Pat. No. 5,581,499 discloses a storage element which, in response to the receipt of ionizing radiation, creates a color center which may be detected by radiating the color center with light of a predetermined frequency. Such a storage element could be incorporated as a storage element of the present invention.

A simple fiber optic transistor used as a gate would also contain three fiber strands. One strand with the data on it from an external source, another outputting to other fiber optic transistors acting as a data manipulation register, while a third would be laminated between the input and output. This third fiber would have (or not have) light contained within its fiber from the power light source which in turn enables (or disables) the input data stream from passing through to the register.

The use of a constant pulsating light source is as essential to the operation of the present computer as timing pulses are to a standard computer. Any of several well known means may be used to generate the light pulses.

For instance, if a light source modulates at a certain frequency, this light source rate cannot be increased unless additional pulses are inserted unto the same fiber optic line, the additional pulses being out of phase with the first pulsating light source. If computational activity occurs during both halves of the cycle, computer operations will be enhanced. If a transistor requires a control pulse to pass information, the control pulse will be applied in synch with the light source.

This process may also be controlled at the transistor in an other way. A thin film of light limiting material could be situated between the fiber optic lamination. This film would limit or defeat the light from passing through the transistor unless a control pulse was present.

In practice, a fiber optic transistor may be viewed in the same manner as an electronic transistor. Where the input would be an illuminated fiber optic, the current/voltage return path would be the light source, and the output would be an identical signal as the input.

Colored light would be used in the same manner. If a data signal was present at the input to a transistor, a colored or mono-frequency light could be used control transmission of light through the transistor.

Colored light would also be used to the enhance memory storage. Light responsive materials would be used to store light energy when light is gated to the storage transistor making it a computer "one" state. If such material needs to be converted to a "zero" storage, a colored light could be gated to the material making it, in effect, a zero.

A flip-flop may be fabricated in accordance with the general principles of the current invention. Light responsive material would be attached to the output of a "one" side of a flip-flop that would be an enable for the other half of a flip-flop. When another input trigger and a timing light was or became present at the other or "zero" side then the flip-flop would change state (or flop). There would light responsive material on each of the flip-flop outputs acting as steady-state memory.

An example of a fiber optic timing device could be a fiber optic flip-flop, as mentioned above, with input to one side receiving a short burst of light at computer turn on. Input to both sides of the flip-flop would be laminated together so as to provide a constant source of light to both (or each half of the flip flop) transistor inputs. This would allowing the side that received the initial burst of light to become the "one" state and thus enabling the "zero" state. When enabled, the flip-flop would change state and enable the other half of the flip-flop. From either side or half of the flip-flop, a pulsed light would be present and could be used as timing for other computer activities. Other devices could be developed to achieve this same functionality.

In another aspect of the present invention, the objective is to create computers and digital processors that are not required to transition from processing digital data on fiber optics to conventional digital data circuitry to interface with present computers. In accordance with this aspect of the invention, digital data traveling along a fiber optic path may be directly input to a computer having an optical data input port.

In another aspect of the invention, data of a particular frequency may be selectively transmitted along a fiber optic line to a terminating junction, by introducing dissimilar (frequency) light into another fiber optic line at a particular junction. The light may cause a local reaction which either allows light to pass or blocks passage. The present invention contemplates a considerable number of such junctions in order to make a processor capable of performing operations on data. This would require the fiber optic lines and associated transistors to be ultra thin. The junctions could be made by compressing, input, output, and control fiber optic lines to thin laminated layers.

The laminated junction can be held in place on the processing board by thin laminated layers of nonferrous dark or black material such that no light of any color could inappropriately be passed to any other fiber optic line or junction. This same lamination process could be used for the master control (or "Mother or Daughter") boards whereby the fiber optic lines could be arranged in such a way as to allow interface with parts of the board or peripheral to the laminated board. Mono-frequency digital data codes can be transmitted in a bi-directional method allowing transmission speeds near the limits of the light spectrum.

In another aspect of the invention, information can be routed directly to a screen display with each pixel represented by a single strand of fiber.

The power source that can be used for illuminating the fiber optics may be a chemical, possibly in a gel form for physical stability, which reacts to produce light without heat. Different frequencies of light can be generated from various combinations of chemicals as is well known in the art. Of course, the ends of the fiber optics must be in close proximity to the chemical.

In another aspect of the invention, timing signals may be transmitted to a junction using a single fiber optic strand for carrying a signal which allows or disallow that junction to pass data. This can be in addition to the use of various colors of the light spectrum for the same purpose as has been previously discuss. The control strand would be placed at the laminated layer just prior to the output of the junction.

In another aspect of the invention, a power unit for generating power for a source of illumination is contemplated. The power unit would include a power generation means, a light source, and a bundle of fiber optics encased in a heavily shielded enclosure.

Accordingly, it is a principal object of the invention to provide a new and improved computing apparatus.

It is a major object of this invention to provide the concept of nonmetallic infrastructure of computer for processing of data and coding.

It is another object of the invention to provide such an improved computer constructed of nonferrous, nonmetallic, or noninductive material so as not to be affected by the environment such as by temperature, radiation, or processing speed.

It is still another object of the invention is to provide a computing system which is adaptable to space systems where radiation is a hazard to electronic equipment.

It is still another object of the invention to provide a computer system where radiation from electronic equipment is eliminated or substantially reduced.

It is still another object of the invention to provide a an optical computer functional process of this fiber optic computer in the present environment would be substantially similar to conventional digital computers.

It is another object of the invention is to compute with unlimited speed the conversion of audio or voice to text as well as the increase in video processing and, therefore, will enhance those processes.

It is yet another object of the invention to provide an improve storing into memory most of the dialects and inflection's will provide reliable conversions.

It is yet another object of the invention to provide an improved ultra thin fiber strands that will allow data flow on multiple paths to arrive in time at its destination for processing.

Finally, it is a general object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 3 is a top view of a four fiber optic lead transistor formed in accordance with the present invention.

FIG. 4a is a side view, partly in section, of a first embodiment identifying the relationship of fiber optic leads intersecting a transistor junction.

FIG. 4b is a top view, partly in section, of a first embodiment identifying the relationship of fiber optic leads intersecting a transistor junction.

FIG. 4c is a perspective view, partly in section, of a first embodiment identifying the relationship of fiber optic leads intersecting a transistor junction.

FIG. 7a is perspective view, partly in section, of the present arrangement of the heat generating core.

FIG. 7b is a top view, partly in section, of the present arrangement of the heat generating core.

FIG. 7c is a side view, partly in section, of the present arrangement of the heat generating core.

FIG. 8a is a top view of the coolant lines.

FIG. 8b is a side view of the coolant lines.

FIG. 9a is a top view of the turbine/generator apparatus of the present invention.

FIG. 9b is a side view of the turbine/generator apparatus of the present invention.

FIG. 10a is a side view of the cooling line for the generator of the present invention.

FIG. 10b is a top view of the cooling line for the generator of the present invention.

DETAILED DESCRIPTION OF THE PREFERRED EMBODIMENT'S

Referring now to FIGS. 1–4, the fiber optic junction transistor and related apparatus of the present invention, generally indicated by the numeral 10, is shown.

Figure 1:
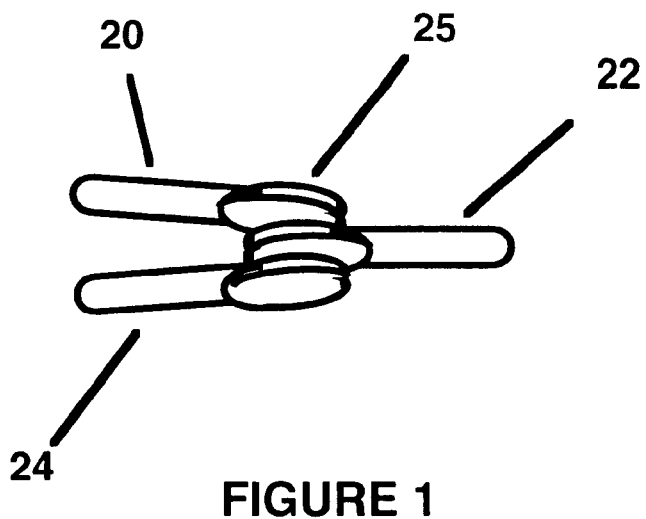
FIG. 1 is one is a perspective view of fiber optic strands terminating at a transistor element of the present invention.
Figure 2:
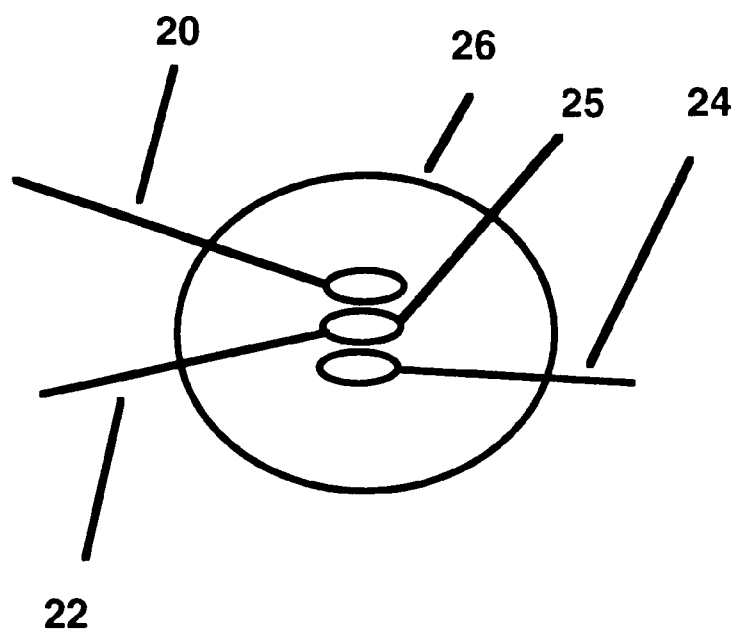
FIG. 2 is a top view of an optical transistor formed in accordance with the present invention.
Figure 5:
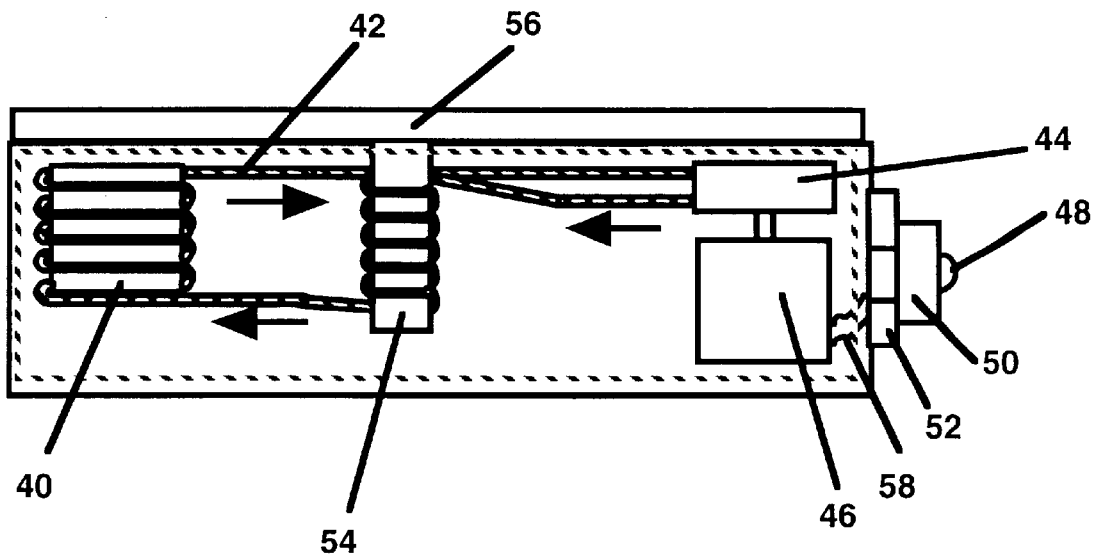
FIG. 5 is a side view, partly in section, of the turbine/generator light source of the present invention.
Figure 6:
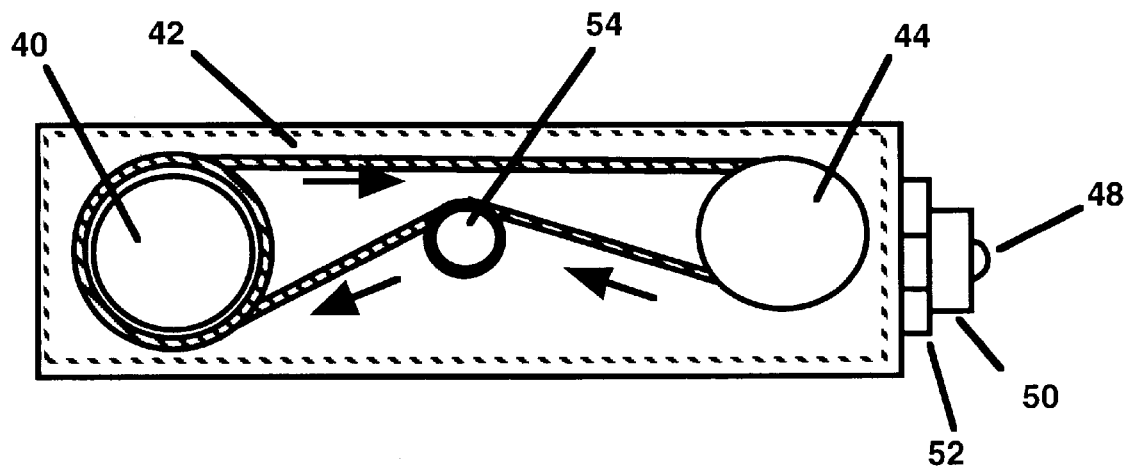
FIG. 6 is a top view, partly in section, of the present turbine/generator light source construction apparatus of the present invention arrangement of FIG. 5.
Figure 11:
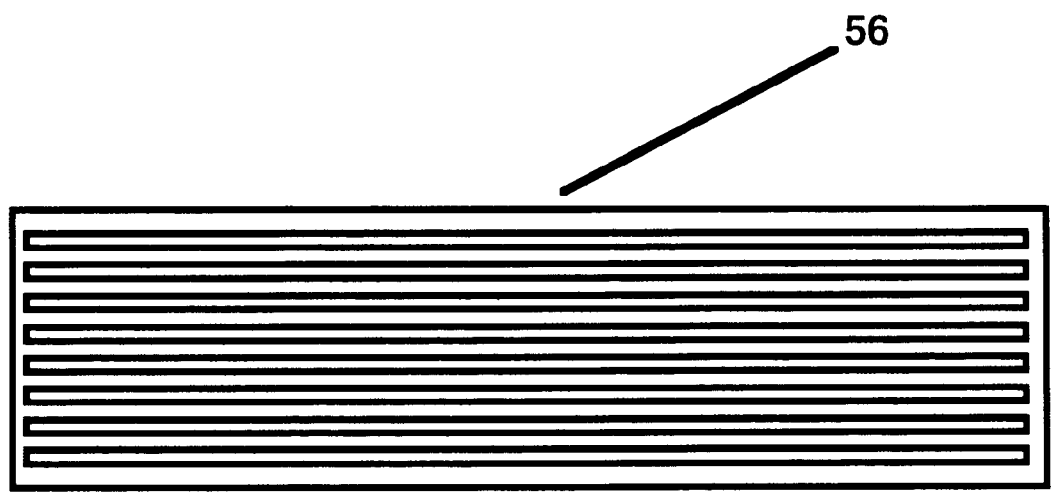
FIG. 11 is a top view of the cooling fins for the generator of the present invention.

It is to be understood that the present invention is not limited to the sole embodiment described above, but encompasses any and all embodiment's within the scope of the following claims:

FIGS. 1 through 3 show some possible arrangements of light responsive elements in an optical transistor in accordance with the present invention.

FIG. 1 shows fiber optic lines 20, 22, and 24 terminating at a junction with the end of each fiber strand compressed so as to distribute light to or through other fiber strands to effect transmission of light. A plurality of these junctions or optical transistors 25 are combined to form a junction cylinder 26.

Fiber optic lines 20, 22, 24 can be clear or colored. Clear strands would allow for use with colored lights while colored strands would allow for use of white light.

The use of colored strands would allow for more economical construction. Colored cables (multifiber strands) consisting of the three prime colored strands may be advantageously used in the construction of data display systems.

FIGS. 2 and 3 show fiber optic transistors formed in accordance with the present invention. Input fiber or line 20 directs a light pulse containing input data to the transistor, a control fiber 22 directs a control pulse to the transistor, and an output fiber conducts light generated within the transistor to a register or output device such as a display (not shown).

Care must be taken when constructing the transistors to minimize any loss of light occurring at the junction between the fiber optic and the transistor 25. Light tight couplings such as those known in the art may be used. Alternatively, the fiber optics 20, 22, 24 may be laminated or fused to the transistors 25. More than one control fiber can be used in a junction to allow more than one source or output to be controllably connected to the transistor. For instance, both a display and a register may controllably gate information from the same transistor. Effectively "And", "Or" or other logic gates which facilitate basic Boolean algebra logic operations may be used to simulate the operation of their electronic counterparts.

FIGS. 4a–4c, show the fiber optic transistor junction cylinder 26 into which fiber optic lines would terminate and be laminated. In order to route and separate fiber optic lines, to eliminate cross talk, slots 28 are situated around the cylinder 26 at different levels to allow routing of optic fiber lines to their respective transistors.

The laminating material could be of a thin soft pliable material so as not to unduly compress the fiber optic lines. Lamination or fusing the fiber optic transistors 25 is preferably done with dark/black resin or plastic to eliminate noise or cross talk between adjacent transistors.

In one embodiment, a chemical reaction may be used to generate light for the computer of the present invention. The computer 10 would be able to process data as long as the reaction is sustained.

FIGS. 5 through 11 show an atomic power source which may be used with the present invention especially in space applications. The invention contemplates a relatively small reactor which would allow use of the power source on board a space craft. In accordance with the invention, the power source would be used solely to provide a source of light energy for the computing apparatus 10.

The core 40, which contains the reaction as is well known in the art, provides the heat source 42 to the turbine 44 which in turn turns the generator 46 thereby providing enough electrical power to effectively light a light 48 source fiber optic requirements. Light 48 is held in place with light encasement 50 and by hold down nut 52. Heat dissipation post 54 is a sub part of heat dissipation plate 56. It should be noted that the reactor is modeled after conventional atomic reactors in terms of the basic functional elements.

FIGS. 7a–c show the construction of the sealed heat core 40 with radiating material constructed in the form of wafers 60 with each wafer 60 spaced sufficiently to allow fluid such as water to absorb generated heat. The core 40 is made of radiation proof material.

FIGS. 8a and 8b show the core 40 with conduits 42 formed as a coil around the core 40. These conduits 42 contain fluid capable of heating and cooling rapidly. The fluid motion would be directed to the turbine 44 causing it to turn which in turn causes generator 46 to turn and generate sufficient electricity to light the low level light 48 through wires 58. The fluid 44 would then pass through coil wrapped around cooling post 54 and back to core 40 coil. Heat would be dissipated from post 54 through cooling fin plate 56.

The external input and output can be by means of optical CD mechanism, not shown. Alternatively, coded light pulses may be used as input signals.

Input/Output can be by inserting a flat laminated plate or ribbon, not shown, containing light sensitive material, between the light source and the ends of the fiber optic lines, or at the output of the fiber optic lines. The plate may be moved by a mechanical means (not shown) and is preferably held in place by nonferrous, nonmetallic, or noninductive clip means. The ends or tips of the processor input/output would be directed at the light sensitive material and the plate would be used as a removable storage.

Each processor would be removably connected to the computer housing by nonferrous, nonmetallic, or noninductive clips.

The construction of a junction can be relatively easy and would be far less expensive than using rare or precious metal in construction of present day processors.

I claim:

1. An optical computer apparatus comprising:

a source of electromagnetic radiation;
   a plurality of fiber optic conduits connected to said source of electromagnetic radiation;
   a processor connected to said fiber optic conduits for receiving electromagnetic radiation therefrom, said processor including a plurality of vertically stacked optical junctions, each of said junctions connected to at least three of said optical fibers, said at least three optical fibers terminating at respective light sensitive regions formed within said junctions, a first one of said at least three optical fibers functioning as an input fiber, a second one of said at least three optical fibers functioning as an output fiber, and a third one of said optical fibers functioning as a control fiber;

input means for inputting commands and data to said processor;

data manipulation means connected to said input means via said optical fibers for performing selected operations on said commands and data; and, display means connected to said data manipulation means and said processor means for displaying results of said selected operations.

2. The apparatus of claim 1 wherein said light sensitive regions undergo physical changes in response to electromagnetic radiation.

3. The apparatus of claim 2 wherein said physical changes can be determined by irradiating said light sensitive regions with electromagnetic radiation of a predetermined frequency.

* * * * *